United States Patent
Liao et al.

(10) Patent No.: US 9,554,253 B2
(45) Date of Patent: Jan. 24, 2017

(54) LOCATING METHOD, DRIVE TEST TERMINAL AND HAND-HELD TERMINAL

(71) Applicants: SHANGHAI DATANG MOBILE COMMUNICATIONS EQUIPMENT CO., LTD, Shanghai (CN); DATANG MOBILE COMMUNICATIONS EQUIPMENT CO., LTD, Beijing (CN)

(72) Inventors: Jun Liao, Shanghai (CN); Jun Ma, Shanghai (CN)

(73) Assignees: SHANGHAI DATANG MOBILE COMMUNICATIONS EQUIPMENT CO., LTD, Shanghai (CN); DATANG MOBILE COMMUNICATIONS EQUIPMENT CO., LTD, Beijing (CN)

( * ) Notice: Subject to any disclaimer, the term of this patent is extended or adjusted under 35 U.S.C. 154(b) by 0 days.

(21) Appl. No.: 14/759,416

(22) PCT Filed: Jan. 3, 2014

(86) PCT No.: PCT/CN2014/070066
§ 371 (c)(1),
(2) Date: Jul. 7, 2015

(87) PCT Pub. No.: WO2014/108045
PCT Pub. Date: Jul. 17, 2014

(65) Prior Publication Data
US 2015/0358784 A1 Dec. 10, 2015

(30) Foreign Application Priority Data

Jan. 9, 2013 (CN) .......................... 2013 1 0008342

(51) Int. Cl.
*H04W 24/00* (2009.01)
*H04W 4/04* (2009.01)
(Continued)

(52) U.S. Cl.
CPC ............ *H04W 4/043* (2013.01); *G01C 21/206* (2013.01); *G01C 25/005* (2013.01); *H04W 4/025* (2013.01); *H04W 4/04* (2013.01)

(58) Field of Classification Search
CPC ......... H04W 4/025; H04W 4/04; H04W 4/043
(Continued)

(56) References Cited

U.S. PATENT DOCUMENTS 6,366,856 B1 * 4/2002 Johnson ................. G01C 17/28
701/454
7,412,775 B1 * 8/2008 Karnick ................. G01C 19/38
33/316

(Continued)

FOREIGN PATENT DOCUMENTS

CN 102419180 A 4/2012
CN 102457807 A 5/2012
(Continued)

OTHER PUBLICATIONS

Christoph Fuchs et al: "Indoor tracking for mission critical scenarios: A survey", Pervasive and Mobile Computing, Elsevier, NL, vol. 7, No. 1, Jul. 6, 2010, pp. 1-15, XP028139511, ISSN: 1574-1192, DOI: 10.1016/J.PMCJ.2010.07.001.

*Primary Examiner* — Joseph Arévalo
(74) *Attorney, Agent, or Firm* — Gokalp Bayramoglu (57) ABSTRACT

The present invention provides a locating method, a drive test terminal and a hand-held terminal. Herein, the locating method comprises: a first terminal receiving an included angle value between a current advancing direction of a user and a due north direction, which is sent from a second
(Continued)

terminal, wherein the first terminal is provided with a gyroscope, the second terminal is used to calculate the included angle value of the included angle between the current advancing direction and the due north direction according to the current advancing direction input by the user and a due north direction indication diagram, and send the included angle value to the first terminal; and the first terminal using the included angle value to correct an output angle of the gyroscope, so as to locate the first terminal. By the present invention, the directional angle may be accurately determined without using a magnetometer.

7 Claims, 5 Drawing Sheets

(51) Int. Cl.
*H04W 4/02* (2009.01)
*G01C 21/20* (2006.01)
*G01C 25/00* (2006.01)

(58) Field of Classification Search
USPC .................................. 455/456.1, 456.6, 561
See application file for complete search history.

(56) References Cited

U.S. PATENT DOCUMENTS

| | | | |
|---|---|---|---|
| 7,698,063 B2 | 4/2010 | Kim | |
| 2006/0287085 A1* | 12/2006 | Mao | A63F 13/06 463/37 |
| 2011/0015862 A1* | 1/2011 | Sato | E21B 47/022 702/6 |
| 2013/0192072 A1* | 8/2013 | Gnepf | G01C 19/38 33/228 |
| 2014/0022539 A1* | 1/2014 | France | G01C 15/00 356/139.1 |
| 2014/0278183 A1* | 9/2014 | Zheng | G01P 21/00 702/96 |

FOREIGN PATENT DOCUMENTS

| | | |
|---|---|---|
| CN | 102506837 A | 6/2012 |
| CN | 103091662 A | 5/2013 |
| WO | WO2012037576 A2 | 3/2012 |

* cited by examiner

LOCATING METHOD, DRIVE TEST TERMINAL AND HAND-HELD TERMINAL

TECHNICAL FIELD

The present invention relates to the field of communication technologies, and particularly to a locating method, a drive test terminal and a hand-held terminal in an indoor network coverage test.

BACKGROUND ART

With a rapid growth of the amount of mobile users and a great increase of high-rise buildings, traffic density and coverage requirements are constantly rising. Most of existing buildings with large scale and good quality have a strong shielding effect upon mobile communication signal. In lower floors of large-scale buildings, underground shopping malls, underground parking lots and other environments, there are blind spots and shadow areas of mobile communication, where mobile communication signal is so weak that mobile phones can not work properly. Further, in middle floors, since signals from different base stations overlap, resulting in ping-pong effect, the mobile phones are switched frequently and even get calls dropped, which seriously affects the normal use of mobile phones. High floors of buildings, due to restrictions by the height of the base station antenna, can not be properly covered, where the blind spots of mobile communication are also formed. These have caused that the mobile users are not able to normally use their mobile terminals.

To this end, indoor network coverage test technologies have been applied in construction of mobile communication network. During the indoor network coverage test, an indoor drive test terminal can realize a collection operation of wireless interface data in relation to multiple modes in accordance with a predefined testing scheme or real-time instructions of a drive test platform; a hand-held terminal (such as, tablet PC, mobile phone and notebook) cooperatively used with the indoor drive test terminal may display indoor advancing track. In combination of the data collected by the indoor drive test terminal and the advancing track of the hand-held terminal, the network coverage condition of various indoor positions can be tested.

However, during the testing of the indoor drive test terminal, there is no GPS (Global Positioning System) signals under most environments, so a gyroscope is usually used to realize indoor location. The gyroscope generally includes a tri-axial angular velocity meter, a tri-axial accelerometer and a tri-axial magnetometer. When the gyroscope is used to realize the indoor location, adaptive Kalman data fusion algorithm is generally adopted. The algorithm necessarily performs indoor location in accordance with a directional angle of the indoor drive test terminal. Usually, when setting the directional angle, the indoor drive test terminal may set by adopting a deviation between the magnetometer angle and the due north angle in conjunction with the shape of the building, so as to determine the directional angle of the indoor location.

That is, the existing schemes for indoor location depend on the magnetometer. However, there is a great amount of electro-magnetic interference in the indoor environment, such as entrance guard system, elevator room and etc. Thus, the magnetometer may be interfered to cause the magnetometer to be unreliable and to generate a significant deviation, such that the directional angle of the indoor location could not correctly determined, and then the indoor network coverage test is inaccurate.

SUMMARY OF THE INVENTION

The present invention provides a locating method, a drive test terminal and a hand-held terminal for indoor network coverage test, in order to solve problems that the existing schemes for indoor location can not accurately determine the directional angle for indoor location with a great amount of electro-magnetic interference in the indoor environment such that the indoor network coverage test is inaccurate.

In order to solve above problems, the present invention discloses a locating method, comprising: a first terminal receiving an included angle value between a current advancing direction of a user and a due north direction, which is sent from a second terminal, wherein the first terminal is provided with a gyroscope, the second terminal is used to calculate the included angle value of the included angle between the current advancing direction and the due north direction according to the current advancing direction input by the user and a due north direction indication diagram, and send the included angle value to the first terminal; and the first terminal using the included angle value to correct an output angle of the gyroscope, so as to locate the first terminal.

Preferably, the locating method further comprises: the first terminal setting a current angle of the gyroscope to 0 degree when receiving the included angle value.

Preferably, the step of the first terminal using the included angle value to correct an output angle of the gyroscope, comprises: when outputting angle, the first terminal using the sum of a current to-be-output angle of the gyroscope and the included angle value as a corrected output angle.

In order to solve above problems, the present invention discloses another locating method, comprising: a second terminal receiving a current advancing direction input by a user, and calculating an included angle value between the current advancing direction and a due north direction according to a due north direction indication diagram; the second terminal receiving an output angle of a gyroscope, which is sent from a first terminal; and the second terminal using the included angle value to correct the output angle, so as to locate the first terminal.

Preferably, after the step of the second terminal receiving the current advancing direction input by the user, and calculating the included angle value between the current advancing direction and the due north direction according to the due north direction indication diagram, the method further comprises: the second terminal acquiring a current angle of the gyroscope of the first terminal, and recording the acquired angle as a correction angle; and the step of the second terminal using the included angle value to correct the output angle, comprises: the second terminal using the included angle value and the correction angle to correct the output angle.

Preferably, the step of the second terminal using the included angle value and the correction angle to correct the output angle comprises: the second terminal using a difference obtained by subtracting the correction angle from the sum of the output angle and the included angle value as a corrected angle.

In order to solve above problems, the present invention discloses a drive test terminal, comprising: a receiving module, configured to receive an included angle value between a current advancing direction of a user and a due north direction, which is sent from a hand-held terminal, wherein the drive test terminal is provided with a gyroscope, and the hand-held terminal is used to calculate the included angle value of the included angle between the current advancing direction and the due north direction according to the current advancing direction input by the user and a due north direction indication diagram, and send the included angle value to the drive test terminal; and a first correction location module, configured to use the included angle value to correct an output angle of the gyroscope, so as to locate the drive test terminal.

Preferably, the receiving module is further configured to set a current angle of the gyroscope to 0 degree when receiving the included angle value; the first correction location module is configured to, when outputting angle, use the sum of a current to-be-output angle of the gyroscope and the included angle value as a corrected output angle, to locate the drive test terminal.

In order to solve above problems, the present invention discloses a hand-held terminal, comprising: a calculation module, configured to receive a current advancing direction input by a user, and calculate an included angle value between the current advancing direction and a due north direction according to a due north direction indication diagram; a receiving module, configured to receive an output angle of a gyroscope, which is sent from a drive test terminal; and a second correction location module, configured to use the included angle value to correct the output angle, so as to locate the drive test terminal.

Preferably, the hand-held terminal further comprises: a recording module, configured to, after the calculation module receives the current advancing direction input by the user and calculates the included angle value between the current advancing direction and the due north direction according to the due north direction indication diagram, acquire a current angle of the gyroscope of the drive test terminal, and record the acquired angle as a correction angle; and the second correction location module is configured to use a difference obtained by subtracting the correction angle from the sum of the output angle and the included angle value as a corrected angle, and use the corrected angle to locate the drive test terminal.

Compared to the prior art, the present invention may have following advantages:

In the locating schemes of the present invention, the first terminal provided with the gyroscope may be used as the drive test terminal, and the second terminal may be used as the hand-held terminal, the combination of which may realize location. Herein, the second terminal may be provided with a due north direction indication diagram, such as a map or an outline diagram of a building, and the second terminal may calculate the included angle value between the current advancing direction input by the user and the due north direction according to the indication diagram and then send the included angle value to the first terminal for correcting an output angle of the gyroscope by the first terminal, so as to realize location. In the locating schemes according to the present invention, the directional angle for indoor location may be accurately determined on occasions of a great amount of electro-magnetic interference without using the magnetometer, such that the condition of indoor network coverage may be accurately tested.

DETAILED DESCRIPTION OF THE EMBODIMENTS

In order to readily understand above objects, features and advantages of the present invention, the present invention will be described in detail in conjunction with accompanying drawings and specific embodiments hereinafter.

First Embodiment

Figure 1:
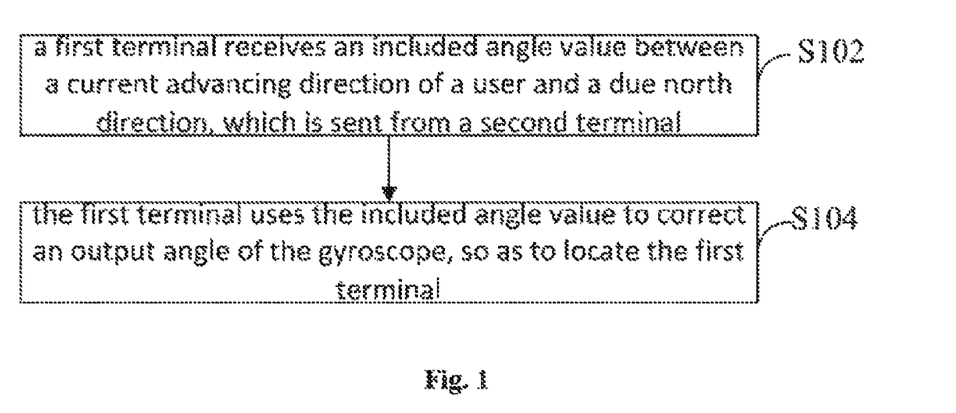
FIG. 1 is a flow chart of a locating method according to a first embodiment of the present invention.

With reference to FIG. 1, it shows a flow chart of a locating method according to a first embodiment of the present invention.

The locating method in this embodiment may comprise the following steps.

Step S102: a first terminal receives an included angle value between a current advancing direction of a user and a due north direction, which is sent from a second terminal.

Herein, the first terminal is provided with a gyroscope; the second terminal is used to calculate the included angle value of the included angle between the current advancing direction and the due north direction according to the current advancing direction input by the user and a due north direction indication diagram, and send the included angle value to the first terminal.

Step S104: the first terminal uses the included angle value to correct an output angle of the gyroscope, so as to locate the first terminal.

When the gyroscope of the first terminal outputs a locating angle, the first terminal may use the included angle value to correct it. The correction needs to first determine the deviation between the gyroscope and the due north direction. For example, a current angle of the gyroscope may be set to 0 degree, then the included angle value may be the deviation between a current direction of the gyroscope and the due north direction, and subsequently the included angle value may be used to correct output angles of the gyroscope during outputting angles; as another example, the current angle of the gyroscope may also be recorded, then the sum of the current angle and the included angle value may be the deviation between the current direction of the gyroscope and the due north direction, and the sum of the current angle and the included angle value may be used to correct the output angles of the gyroscope. Of course, the present invention is not limited thereto, and other manner of recording deviation and using the deviation to correct output angles of the gyroscope may be also applicable.

In this embodiment, the first terminal provided with the gyroscope may be used as the drive test terminal, and the second terminal may be used as the hand-held terminal, the combination of which may realize location. Herein, the second terminal may be provided with a due north direction indication diagram, such as a map or an outline diagram of a building, and the second terminal may calculate the included angle value between the current advancing direction input by the user and the due north direction according to the indication diagram and then send the included angle value to the first terminal for correcting an output angle of the gyroscope by the first terminal, so as to realize location. In the locating schemes according to this embodiment, the directional angle for indoor location may be accurately determined on occasions of a great amount of electro-magnetic interference without using the magnetometer, such that the condition of indoor network coverage may be accurately tested.

Second Embodiment

Figure 2:
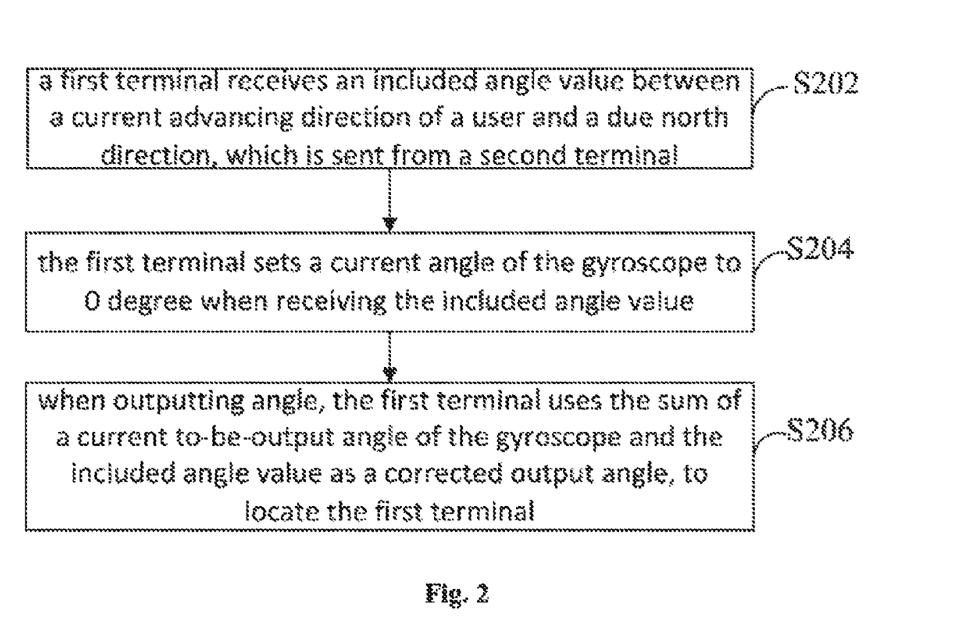
FIG. 2 is a flow chart of a locating method according to a second embodiment of the present invention.

With reference to FIG. 2, it shows a flow chart of a locating method according to a second embodiment of the present invention.

The locating method in this embodiment may comprise the following steps.

Step S202: a first terminal receives an included angle value between a current advancing direction of a user and a due north direction, which is sent from a second terminal.

Herein, the first terminal is provided with a gyroscope; the second terminal is used to calculate the included angle value of the included angle between the current advancing direction and the due north direction according to the current advancing direction input by the user and a due north direction indication diagram, and sent the included angle value to the first terminal.

Step S204: the first terminal sets a current angle of the gyroscope to 0 degree when receiving the included angle value.

By setting the current angle of the gyroscope to 0 degree, a deviation between the gyroscope and the due north direction may be accurately and simply marked.

Step S206: when outputting angle, the first terminal uses the sum of a current to-be-output angle of the gyroscope and the included angle value as a corrected output angle, to locate the first terminal.

For example, the included angle value is 20 degree; after the Step S204, when the gyroscope turn east by 20 degree from the original 0 degree, the corrected output angle is (+20 degree)+20 degree=+40 degree; and the first terminal outputs this angle and uses it to be located.

By mean of this embodiment, during the indoor network coverage test, the directional angle for indoor location may be accurately determined on occasions of a great amount of electro-magnetic interference without using the magnetometer to locate the drive test terminal, such that the condition of indoor network coverage may be accurately tested.

Third Embodiment

Figure 3:
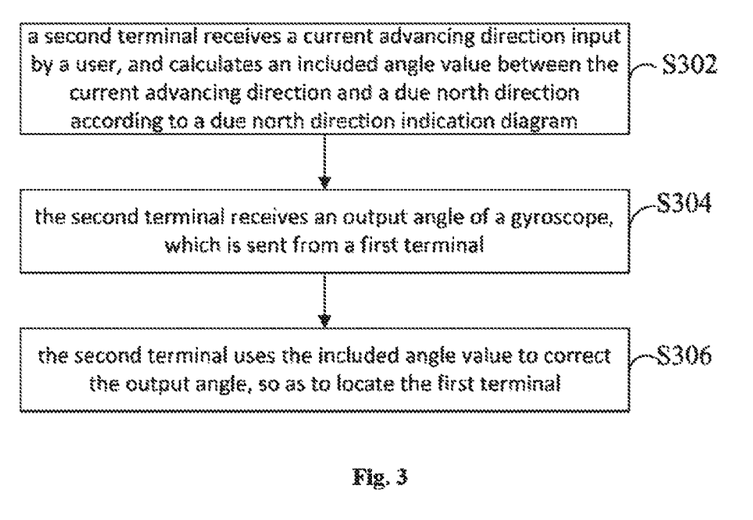
FIG. 3 is a flow chart of a locating method according to a third embodiment of the present invention.

With reference to FIG. 3, it shows a flow chart of a locating method according to a third embodiment of the present invention.

The locating method in this embodiment corresponds to the locating methods in the first and second embodiments, and may comprise the following steps.

Step S302: a second terminal receives a current advancing direction input by a user, and calculates an included angle value between the current advancing direction and a due north direction according to a due north direction indication diagram.

The second terminal may provide an interface for inputting by the user. The user may input the current advancing direction by any suitable manners. For example, the user may input by touching a touch screen, or the user may input by selecting selectable routes provided according to practical situations.

The due north direction indication diagram may adopt any suitable forms, such as outline drawings or maps of buildings. An identifier for indicating the due north direction is generally provided in the diagrams or the maps. For example, after the user inputs the current advancing direction in an outline drawing of a building, the identifier for indicating the due north direction could be used to calculate the included angle value between the current advancing direction and the due north direction.

Step S304: the second terminal receives an output angle of a gyroscope, which is sent from a first terminal.

After determining the included angle value between the current advancing direction and the due north direction, the second terminal may acquire the output angle of the first terminal to calculate a deviation between the gyroscope and the due north direction.

Step S306: the second terminal uses the included angle value to correct the output angle, so as to locate the first terminal.

As described above, the use of the included angle value to correct the output angle may determine the deviation between the gyroscope of the first terminal and the due north direction, so as to accurately correct the first terminal.

By mean of this embodiment, the second terminal may be provided with a corresponding application or device to receive user's input, to calculate the included angle value between the current advancing direction and the due north direction, and to correct the output angle of the gyroscope of the first terminal, such that on the one hand, the location of the first terminal does not necessarily depend on the magnetometer; on the other hand, the first terminal can be accurately located without any modification. By mean of this embodiment, the indoor locating directional angle can be accurately determined, such that the condition of indoor network coverage can be accurately tested.

Fourth Embodiment

Figure 4:
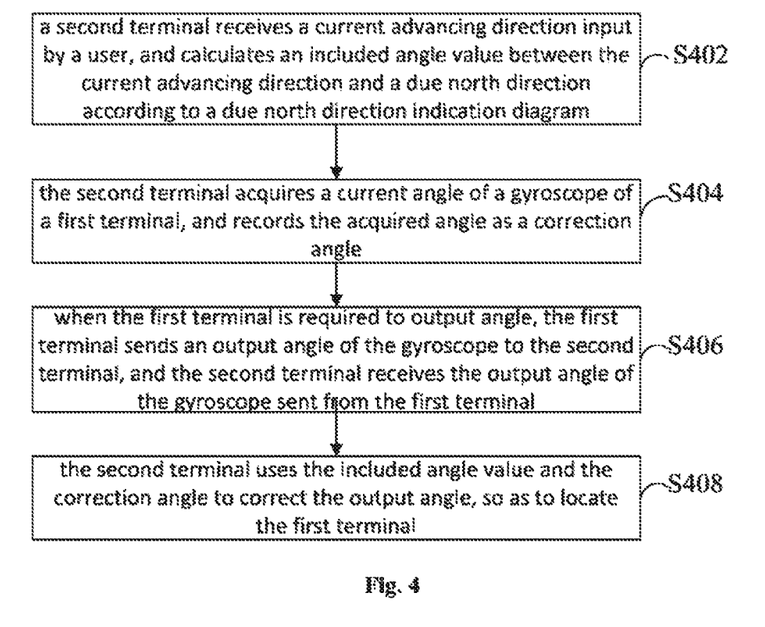
FIG. 4 is a flow chart of a locating method according to a fourth embodiment of the present invention.

With reference to FIG. 4, it shows a flow chart of a locating method according to a fourth embodiment of the present invention.

The locating method in this embodiment is a further preferred scheme based on the locating method in the third embodiment, and may comprise the following steps.

Step S402: a second terminal receives a current advancing direction input by a user, and calculates an included angle value between the current advancing direction and a due north direction according to a due north direction indication diagram.

Preferably, the user may also input a current initial point, and the second terminal may receive the current initial point input by the user to determine the initial point of advance track of the user, in order for the advance location.

Step S404: the second terminal acquires a current angle of a gyroscope of a first terminal, and records the acquired angle as a correction angle.

Step S406: when the first terminal is required to output angle, the first terminal sends an output angle of the gyroscope to the second terminal, and the second terminal receives the output angle of the gyroscope sent from the first terminal.

Step S408: the second terminal uses the included angle value and the correction angle to correct the output angle, so as to locate the first terminal.

This step may comprise: the second terminal using a difference obtained by subtracting the correction angle from the sum of the output angle and the included angle value as a corrected angle.

By mean of this embodiment, the indoor locating directional angle can be accurately determined, such that the condition of indoor network coverage can be accurately tested.

Fifth Embodiment

Figure 5:
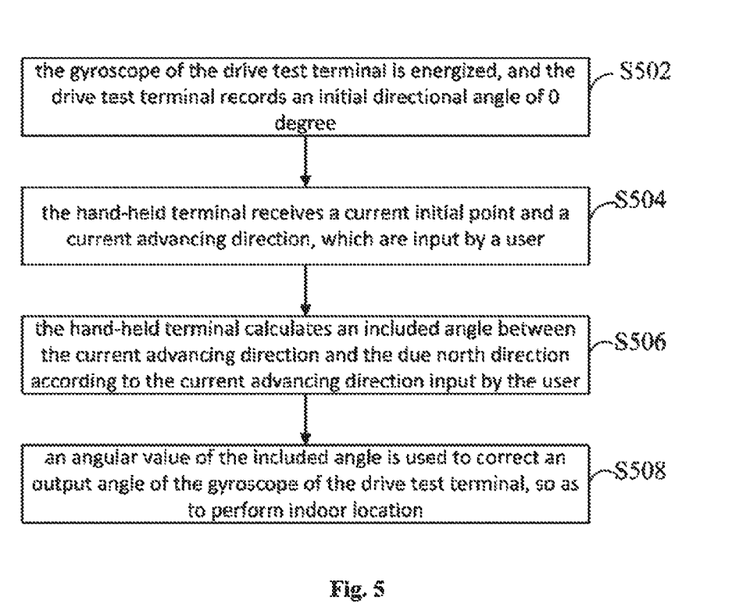
FIG. 5 is a flow chart of a locating method according to a fifth embodiment of the present invention.

With reference to FIG. 5, it shows a flow chart of a locating method according to a fifth embodiment of the present invention.

During the indoor network coverage test, it is required to judge a relationship between the network coverage condition and current position. This indoor network coverage test desirably uses a first terminal having a gyroscope in cooperation with a second terminal to perform indoor location. This embodiment will describe the locating method of the present invention by way of combining operations of the first terminal and the second terminal. In this embodiment, the first terminal is a drive test terminal, which is provided with a gyroscope; the second terminal is a hand-held terminal, which provides an interface for inputting relevant locating parameters for a user.

The locating method in this embodiment may comprise the following steps.

Step S502: the gyroscope of the drive test terminal is energized, and the drive test terminal records an initial directional angle of 0 degree.

The energized gyroscope is required to keep a static status. At this point, an angular accelerometer of the gyroscope is reset, and the angle of 0 degree is set to a current direction. At this point, the angle of 0 degree is randomly set and can not be used for indoor location, and an included angle between the angle of 0 degree and the due north direction is unknown.

Step S504: the hand-held terminal receives a current initial point and a current advancing direction, which are input by a user.

Figure 6:
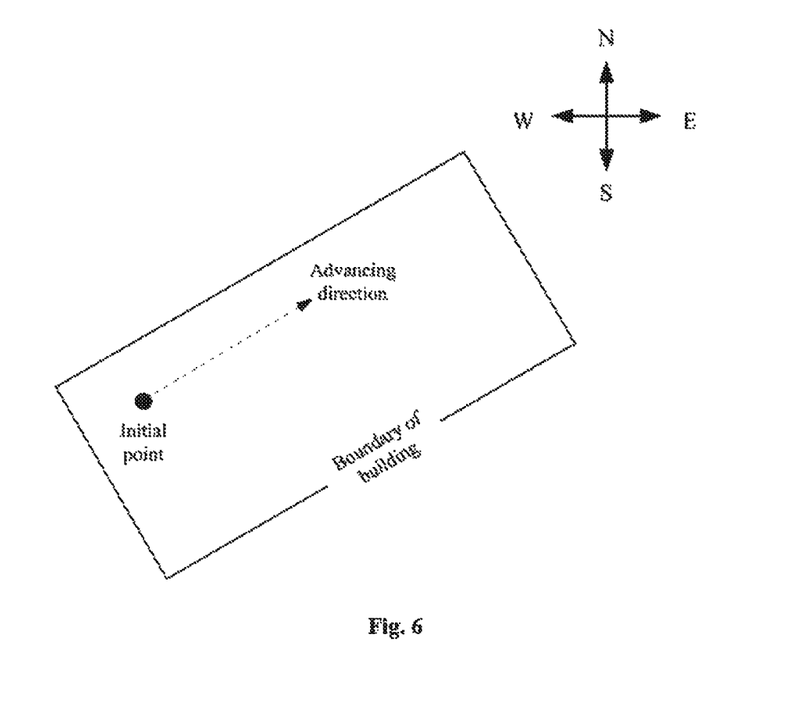
FIG. 6 is a schematic diagram of input of a hand-held terminal in the embodiment of FIG. 5.

The user may select the current initial point and then select the advancing direction on the hand-held terminal (such as, tablet PC, notebook and mobile phone). The advancing direction may be determined by the user according to diagrams of buildings. Input of the current initial point and the current advancing direction by the hand-held terminal is shown in FIG. 6, wherein the periphery frame is a schematic boundary of a building. The user may click within the boundary to select the current initial point to locate a position, and then select the advancing direction, as indicated in an arrow in the Figure. In addition, directional symbols of the building are provided in the Figure, indicating four directions of east, west, north and south of the building.

Step S506: the hand-held terminal calculates an included angle between the current advancing direction and the due north direction according to the current advancing direction input by the user.

After selecting the advancing direction, the hand-held terminal may calculate the included angle between a route of the advancing direction and the due north direction according to the selected advancing direction, and an angular value of the included angle is recorded as a.

Step S508: an angular value of the included angle is used to correct an output angle of the gyroscope of the drive test terminal, so as to perform indoor location.

After α is calculated, the output angle of the gyroscope of the drive test terminal can be corrected by following two schemes:

First scheme: in the case that the directional angle is calculated dependently on the gyroscope, the value of a may be assigned to the gyroscope which records the current angle and the angular value of α and reset the current angle to 0 degree, and from then on, the current angle output is added by a deviation of α, that is Current'=Current+α, wherein Current' refers to the corrected output angle, Current refers to the output current angle. That is, the corrected Current' angle is the sum of the angle output by the gyroscope and the included angle relative to the due north direction, and could be used for indoor location.

Second scheme: in the case that the directional angle is calculated dependently on the hand-held terminal, the hand-held terminal may record the value of a and record the current (at the moment) angular value output by the gyroscope as β, and from then on, when the gyroscope outputs the angular value of Current, a following correction will be made: Current'=Current−β+α. The corrected Current' angle is the included angle between the angle output by the gyroscope and the due north direction, and could be used for indoor location.

Figure 7:
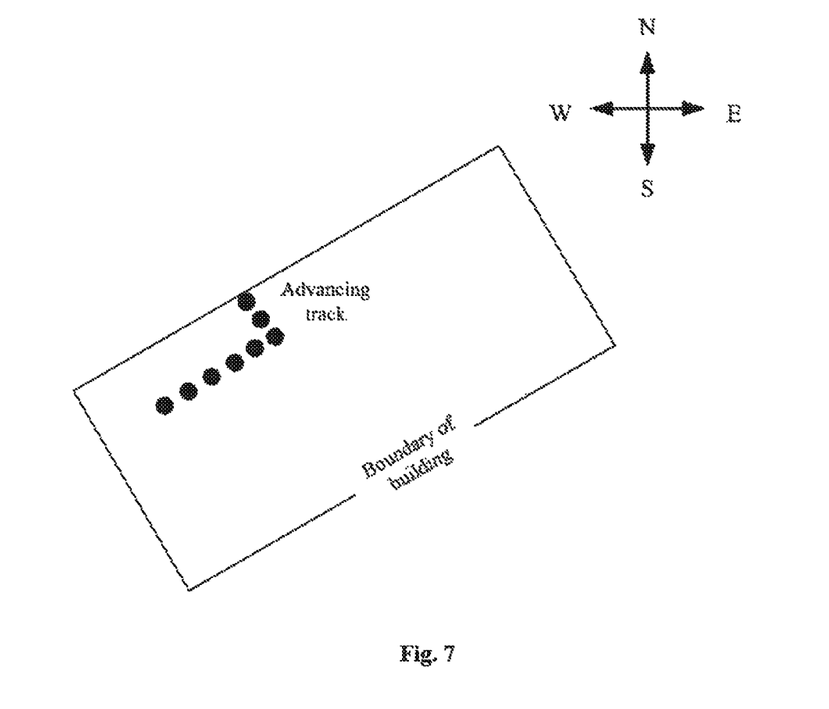
FIG. 7 is a schematic diagram of locating in the embodiment of FIG. 5.

With above location schemes, a located advancing track within a building is shown in FIG. 7, wherein the continuous black solid dots refer to the advancing track and meanings of other symbols are the same as those in FIG. 6.

In indoor location technologies, the judgement of advancing angle of a body is very important. A proper configuration of the included angle between the advancing angle and the due north direction is able to assist in accurately taking on the indoor location track. By mean of this embodiment, there is provided a new scheme for setting an indoor directional angle of the indoor drive test terminal using the gyroscope in cooperation with the hand-held terminal. The angle of the gyroscope can be simply and rapidly set by the hand-held terminal, outline drawings of buildings, the gyroscope and etc. During the indoor network coverage test, the hand-held terminal and outline drawings of buildings are auxiliarily used to set the directional angle of the gyroscope. It is possible to visually set the initial point and body advancing direction to configure the indoor location parameters, so as to acquire the included angle between the gyroscope angle and the due north angle. The gyroscope may directly output the included angle relative to the due north direction, or the hand-held terminal may calculate the included angle relative to the due north direction according to relevant information.

Sixth Embodiment

Figure 8:
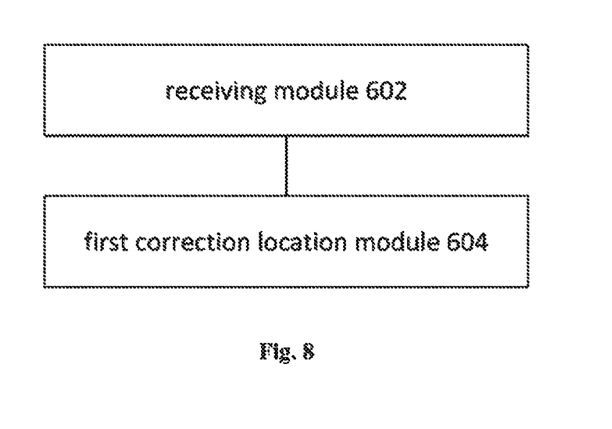
FIG. 8 is a block diagram of a drive test terminal according to a sixth embodiment of the present invention.

With reference to FIG. 8, it shows a block diagram of a drive test terminal according to a sixth embodiment of the present invention.

The drive test terminal in this embodiment may include: a receiving module 602, configured to receive an included angle value between a current advancing direction of a user and a due north direction, which is sent from a hand-held terminal, wherein the drive test terminal is provided with a gyroscope, and the hand-held terminal is used to calculate the included angle value of the included angle between the current advancing direction and the due north direction according to the current advancing direction input by the user and a due north direction indication diagram, and send the included angle value to the drive test terminal; a first correction location module 604, configured to use the included angle value to correct an output angle of the gyroscope, so as to locate the drive test terminal.

Preferably, the receiving module 602 is further configured to, when receiving the included angle value, set a current angle of the gyroscope to 0 degree; the first correction location module 604 is configured to, when outputting angle, use the sum of a current to-be-output angle of the gyroscope and the included angle value as a corrected output angle, to locate the drive test terminal.

The drive test terminal in this embodiment may be used to realize the corresponding locating methods of the drive test terminal in the method embodiments as described above, and have advantageous effects corresponding to the method embodiments, the description of which will be omitted herein.

Seventh Embodiment

Figure 9:
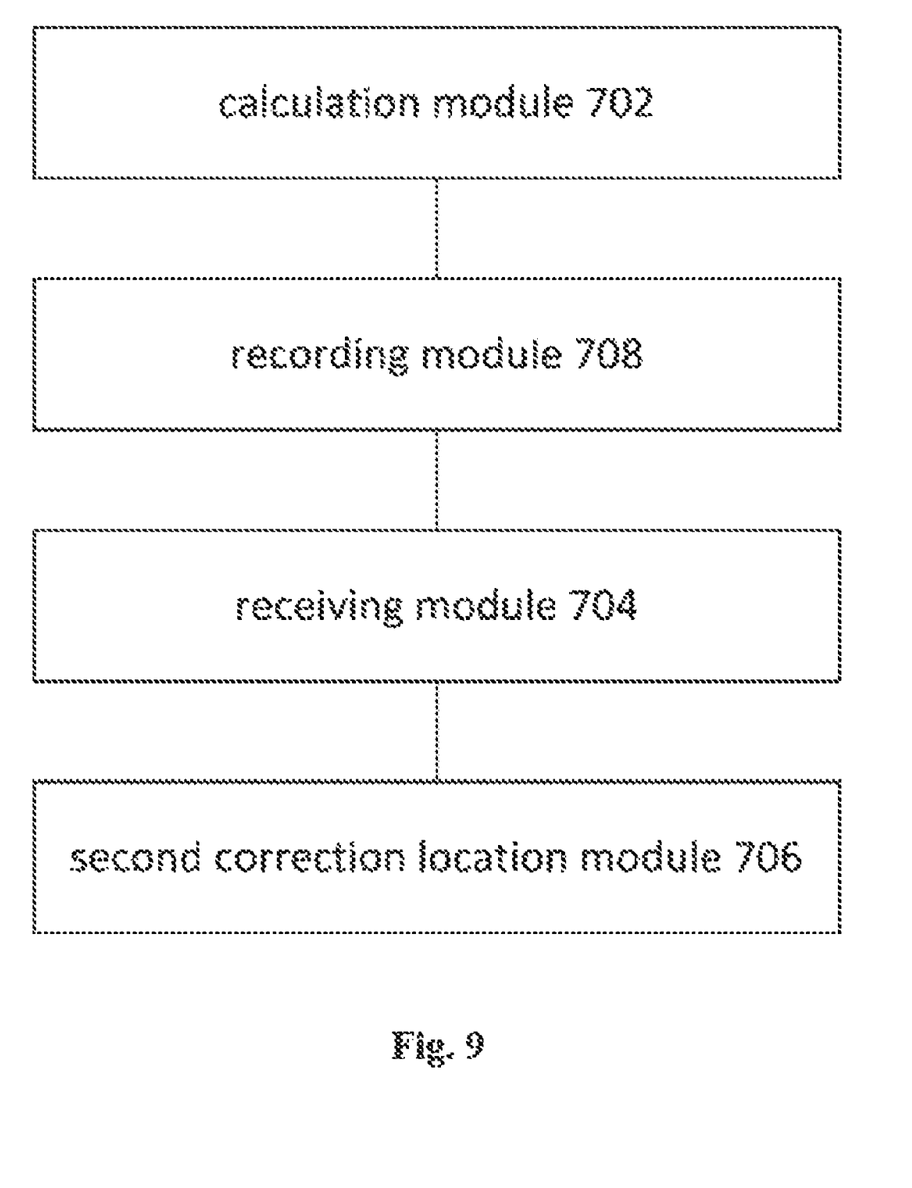
FIG. 9 is a block diagram of a hand-held terminal according to a seventh embodiment of the present invention.

With reference to FIG. 9, it shows a block diagram of a hand-held terminal according to a seventh embodiment of the present invention.

The hand-held terminal in this embodiment may include: a calculation module 702, configured to receive a current advancing direction input by a user, and calculate an included angle value between the current advancing direction and a due north direction according to a due north direction indication diagram; a receiving module 704, configured to receive an output angle of a gyroscope, which is sent from a drive test terminal; a second correction location module 706, configured to use the included angle value to correct the output angle, so as to locate the drive test terminal.

Preferably, the hand-held terminal in this embodiment may further include: a recording module 708, configured to, after the calculation module 702 receives the current advancing direction input by the user and calculates the included angle value between the current advancing direction and the due north direction according to the due north direction indication diagram, acquire a current angle of the gyroscope of the drive test terminal, and record the acquired angle as a correction angle; the second correction location module 706, configured to use a difference obtained by subtracting the correction angle from the sum of the output angle and the included angle value as a corrected angle, and use the corrected angle to locate the drive test terminal.

The hand-held terminal in this embodiment may be used to realize the corresponding locating methods of the hand-held terminal in the method embodiments as described above, and have advantageous effects corresponding to the method embodiments, the description of which will be omitted herein.

Various embodiments in the specification have been described step by step. Each embodiment only emphasizes the differences from other embodiments. Same or similar parts between the embodiments can refer to each other. Since the device embodiments of the drive test terminal and the hand-held terminal are substantially similar to the method embodiments, the description thereof is relatively brief. As for the related parts thereof, reference may be made to the corresponding description of the method embodiments.

The locating method, the drive test terminal and the hand-held terminal according to the present invention have been described in detail. Herein the principles and implementation manners of the present invention are illustrated by way of the specific examples in the specification. The embodiments described above are only intended to help understand the method and main concept of the present invention. Meanwhile, for an ordinary skilled in the art, variations could be made to the specific embodiments and their application scope in accordance with the concept of the present invention. In summary, the disclosure of the specification should not be construed as limiting of the present invention.

The invention claimed is:

1. A locating method, comprising:
   a first terminal receiving an included angle value between a current advancing direction of a user and a due north direction, which is sent from a second terminal, wherein the first terminal is provided with a gyroscope, wherein the second terminal is provided with a due north direction indication diagram, and wherein the second terminal is used to calculate the included angle value of the included angle between the current advancing direction and the due north direction according to the current advancing direction input by the user and the due north direction indication diagram, and send the included angle value to the first terminal;
   the first terminal setting a current angle of the gyroscope to 0 degree when receiving the included angle value; and
   the first terminal using the included angle value to correct an output angle of the gyroscope, so as to locate the first terminal;
   when outputting an angle, the first terminal using a sum of a current to-be-output angle of the gyroscope and the included angle value as a corrected output angle.

2. A locating method, comprising:
   a first terminal receiving an included angle value between a current advancing direction of a user and a due north direction, which is sent from a second terminal, wherein the first terminal is provided with a gyroscope;
   the first terminal setting a current angle of the gyroscope to 0 degree when receiving the included angle value; and
   the first terminal using the included angle value to correct an output angle of the gyroscope, so as to locate the first terminal;
   when outputting an angle, the first terminal using a sum of a current to-be-output angle of the gyroscope and the included angle value as a corrected output angle;
   a second terminal receiving a current advancing direction input by a user, and calculating an included angle value between the current advancing direction and a due north direction according to the current advancing direction and a due north direction indication diagram, wherein the second terminal is provided with the due north direction indication diagram;
   the second terminal receiving an output angle of a gyroscope, which is sent from the first terminal; and
   the second terminal using the included angle value to correct the output angle, so as to locate the first terminal.

3. The method according to claim 2, wherein,
   after the step of the second terminal receiving the current advancing direction input by the user, and calculating the included angle value between the current advancing direction and the due north direction according to the due north direction indication diagram, the method further comprises: the second terminal acquiring the current angle of the gyroscope of the first terminal, and recording the acquired angle as a correction angle; and the step of the second terminal using the included angle value to correct the output angle, comprises: the second terminal using the included angle value and the correction angle to correct the output angle.

4. The method according to claim 3, wherein the step of the second terminal using the included angle value and the correction angle to correct the output angle, comprises:

the second terminal using a difference obtained by subtracting the correction angle from the sum of the output angle and the included angle value as a corrected angle.

5. A drive test terminal, comprising:

a gyroscope, wherein the drive test terminal is configured to receive an included angle value between a current advancing direction of a user and a due north direction, which is sent from a hand-held terminal, the included angle value of the included angle between the current advancing direction and the due north direction is calculated by the hand-held terminal according to the current advancing direction input by the user and a due north direction indication diagram, and the included angle value is sent to the drive test terminal;

the due north direction indication diagram is provided in the hand-held terminal;

the drive test terminal is further configured to set a current angle of the gyroscope to 0 degree when receiving the included angle value;

the drive test terminal is configured to use the included angle value to correct an output angle of the gyroscope, so as to locate the drive test terminal; and the drive test terminal is configured to, when outputting an angle, use a sum of a current to-be-output angle of the gyroscope and the included angle value as a corrected output angle.

6. A hand-held terminal, which is configured to receive a current advancing direction input by a user, and calculate an included angle value between the current advancing direction and a due north direction according to the current advancing direction and a due north direction indication diagram, wherein the hand-held terminal is provided with the due north direction indication diagram;

wherein the hand-held terminal is configured to receive an output angle of a gyroscope, which is sent from a drive test terminal;

the drive test terminal is further configured to set a current angle of the gyroscope to 0 degree when receiving the included angle value;

the drive test terminal is configured to, when outputting an angle, use a sum of a current to-be-output angle of the gyroscope and the included angle value as a corrected output angle; and the hand-held terminal is configured to use the included angle value to correct the output angle, so as to locate the drive test terminal.

7. The hand-held terminal according to claim 6, wherein the hand-held terminal is configured to, after the hand-held terminal receives the current advancing direction input by the user and calculates the included angle value between the current advancing direction and the due north direction according to the due north direction indication diagram, acquire the current angle of the gyroscope of the drive test terminal, and record the acquired angle as a correction angle; and the hand-held terminal is configured to use a difference obtained by subtracting the correction angle from a sum of the output angle and the included angle value as a corrected angle, and use the corrected angle to locate the drive test terminal.

* * * * *